(12) United States Patent
Ko et al.

(10) Patent No.: US 12,007,875 B2
(45) Date of Patent: Jun. 11, 2024

(54) CHIP HAVING DEBUG MEMORY INTERFACE AND DEBUG METHOD THEREOF

(71) Applicant: Nuvoton Technology Corporation, Hsinchu (TW)

(72) Inventors: Pao-Chen Ko, Hsinchu (TW); Hao-Yang Chang, Hsinchu (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 933 days.

(21) Appl. No.: 17/028,414

(22) Filed: Sep. 22, 2020

(65) Prior Publication Data
US 2021/0089430 A1    Mar. 25, 2021

(30) Foreign Application Priority Data

Sep. 24, 2019    (TW) ................................. 108134486

(51) Int. Cl.
| | |
|---|---|
| G06F 30/20 | (2020.01) |
| G06F 1/3206 | (2019.01) |
| G06F 11/36 | (2006.01) |
| G06F 13/42 | (2006.01) |

(52) U.S. Cl.
CPC ........ G06F 11/3652 (2013.01); G06F 1/3206 (2013.01); G06F 11/3656 (2013.01); G06F 13/4282 (2013.01)

(58) Field of Classification Search
CPC ............. G06F 11/3652; G06F 11/3656; G06F 1/3206; G06F 13/4282

USPC .......................................................... 703/28
See application file for complete search history.

(56) References Cited

U.S. PATENT DOCUMENTS

| | | | |
|---|---|---|---|
| 2009/0217105 A1* | 8/2009 | Hsu ......................... | G06F 11/27 714/45 |
| 2015/0324320 A1* | 11/2015 | Toivanen ............ | G06F 13/4068 710/104 |
| 2016/0330094 A1 | 11/2016 | Kniplitsch | |

OTHER PUBLICATIONS

Peng et al. (An on-chip debugging method based on bus access, 5 pages) (Year: 2013).*
Final Office Action issued in corresponding TW application No. 108134486 dated Dec. 17, 2020.

* cited by examiner

*Primary Examiner* — Andre Pierre Louis
(74) *Attorney, Agent, or Firm* — Muncy, Geissler, Olds & Lowe, P.C.

(57) ABSTRACT

A chip having a debug memory interface includes a processing unit, an internal storage unit, a debug memory interface, and a detection unit. The internal storage unit is used to record status data during operation of the processing unit. The detection unit is used to detect whether the debug memory interface is electrically connected to an external memory device. When the debug memory interface is judged to be electrically connected to the external memory device, a control signal is transmitted to the processing unit in order to trigger the processing unit to read a debug program from the external memory device and execute the debug program to run a debug mode based on the status data.

9 Claims, 5 Drawing Sheets

CHIP HAVING DEBUG MEMORY INTERFACE AND DEBUG METHOD THEREOF

FIELD OF TECHNOLOGY

The invention relates to a chip debug technology, in particular to a chip that can debug directly through a memory interface.

BACKGROUND

When a conventional chip is debugging, a dedicated debug tool, such as a joint test action group (JTAG) or an in-circuit emulator (ICE), is required, and the chip needs to be equipped with dedicated pins for the debug tool. However, there is still no debug tool that can be applicable to small chips with simple circuit structures and a small number of pins on the market.

In addition, the operating mechanism of the current debug tool is made to simulate a processor in the chip, and has permission to access all components in the chip. But the above-mentioned operation mechanism of the debug tool also causes doubts about the chip safety.

SUMMARY

An object according to an embodiment of the invention is to provide a chip with a debug memory interface, so that the small chip can debug without adding too many pins and debug circuits to solve the above-mentioned conventional technical problems.

To achieve the object, a chip having a debug memory interface is provided according to an embodiment of the invention, and the chip comprises a processing unit, an internal storage unit, a debug memory interface, and a detection unit. The internal storage unit is used for recording status data generated during the operation of the processing unit. The detection unit is used for detecting whether the debug memory interface is electrically connected to an external memory device. Further, when the detection unit detects that the debug memory interface is electrically connected to the external memory device, the detection unit generates and outputs a control signal to trigger the processing unit to read a debug program from the external memory device for executing the debug program to run a debug mode based on the status data. Further, when the detection unit detects that the debug memory interface is electrically connected to the external memory device, the detection unit generates and outputs a control signal to trigger the processing unit for reading a debug program from the external memory device to execute the debug program to run a debug mode based on the status data.

According to another embodiment of the invention, the chip having a debug memory interface further comprises a memory interface management unit electrically connected to the debug memory interface, and the memory interface management unit is used by the processing unit to read the debug program from the external memory device.

According to still another embodiment of the invention, the debug memory interface is a serial peripheral interface and a voltage level of a chip select pin therein is detected by the detection unit for judging whether the voltage level is at high voltage level. When the voltage level of the chip select pin is judged as at high voltage level by the detection unit, the serial peripheral interface is judged as being electrically connected to the external memory device by the detection unit and the detection unit outputs the control signal to the processing unit.

According to still another embodiment of the invention, the chip having a debug memory interface further comprises a multiplexer with a plurality of input terminals thereof respectively electrically connected to the functional circuit set and a memory interface circuit group. Moreover, when the detection unit detect absence of the external memory device, the multiplexer is then electrically connected to a plurality of pins (except the chip select pin in the serial peripheral interface) as well as the functional circuit set. In contrary, when the detection unit detects presence of the external memory device, the multiplexer is then electrically connected to the memory interface circuit group as well as the serial peripheral interface.

According to still another embodiment of the invention, the chip having a debug memory interface further comprises a switch, wherein the chip select pin is selectively electrically connected to one of the detection unit and the multiplexer through the switch.

According to still another embodiment of the invention, the control signal is an interrupt signal or a reset signal.

According to still another embodiment of the invention, the chip having a debug memory interface further comprises a power management unit informed by the detection unit to keep the processing unit at an active status so that the debug program is read from the external memory device by the processing unit.

According to still another embodiment of the invention, the debug mode comprises storing the status data in the external memory device by the processing unit.

According to still another embodiment of the invention, the chip having a debug memory interface further comprises an output unit, wherein in the debug mode, the processing unit transmits the status data to the output unit. The output unit comprises a general-purpose input/output pin or a display element. The display element is used to display the status data, while the general-purpose input/output pin is used to transmit the status data to an external device.

To achieve the object, the invention provides a debug method, applied to a chip having a processing unit and an internal storage unit where the internal storage unit is used to store status data generated during the operation of the processing unit. The debug method comprises the following steps. A debug memory interface and a detection unit are provided. Then, the detection unit detects whether the debug memory interface is electrically connected to an external memory device. When the detection unit detects that the debug memory interface is electrically connected to the external memory device, a control signal is generated and output to the processing unit to trigger the processing unit to read a debug program from the external memory device. The debug program is executed by using the processing unit to run a debug mode based on the status data.

According to another embodiment of the invention, the debug memory interface is a serial peripheral interface, and the following steps are further comprised to detect whether the debug memory interface is electrically connected to the external memory device. The detection unit is used to detect whether a voltage level of a chip select pin in the debug memory interface is at high voltage level. When the voltage level of the chip select pin is judged as at high voltage level by the detection unit, the serial peripheral interface is judged as being electrically connected to the external memory device by the detection unit and the detection unit outputs the control signal to the processing unit.

According to still another embodiment of the invention, the control signal is an interrupt signal or a reset signal.

According to still another embodiment of the invention, the chip having a debug memory interface further comprises a power management unit and when the debug memory interface is judged as being electrically connected to the external memory device, the debug method further comprises the following steps. The power management unit is informed by the detection unit to keep the processing unit at an active status so that the debug program is read from the external memory device by the processing unit.

According to still another embodiment of the invention, the debug mode comprises storing the status data in the external memory device by the processing unit.

According to still another embodiment of the invention, the chip having a debug memory interface further comprises an output unit, wherein in the debug mode, the processing unit transmits the status data to the output unit. The output unit comprises a general-purpose input/output pin or a light-signal-driven pin. An external device may be used to receive the status data through the general-purpose input/output pin or the light-signal-driven pin and display the status data.

DETAILED DESCRIPTION

The following describes the implementation according to embodiments of the invention in details with the drawings, so as to fully understand and implement the process of how to use the technical means according to the embodiments of the invention to solve technical problems and achieve technical effects.

Figure 1:
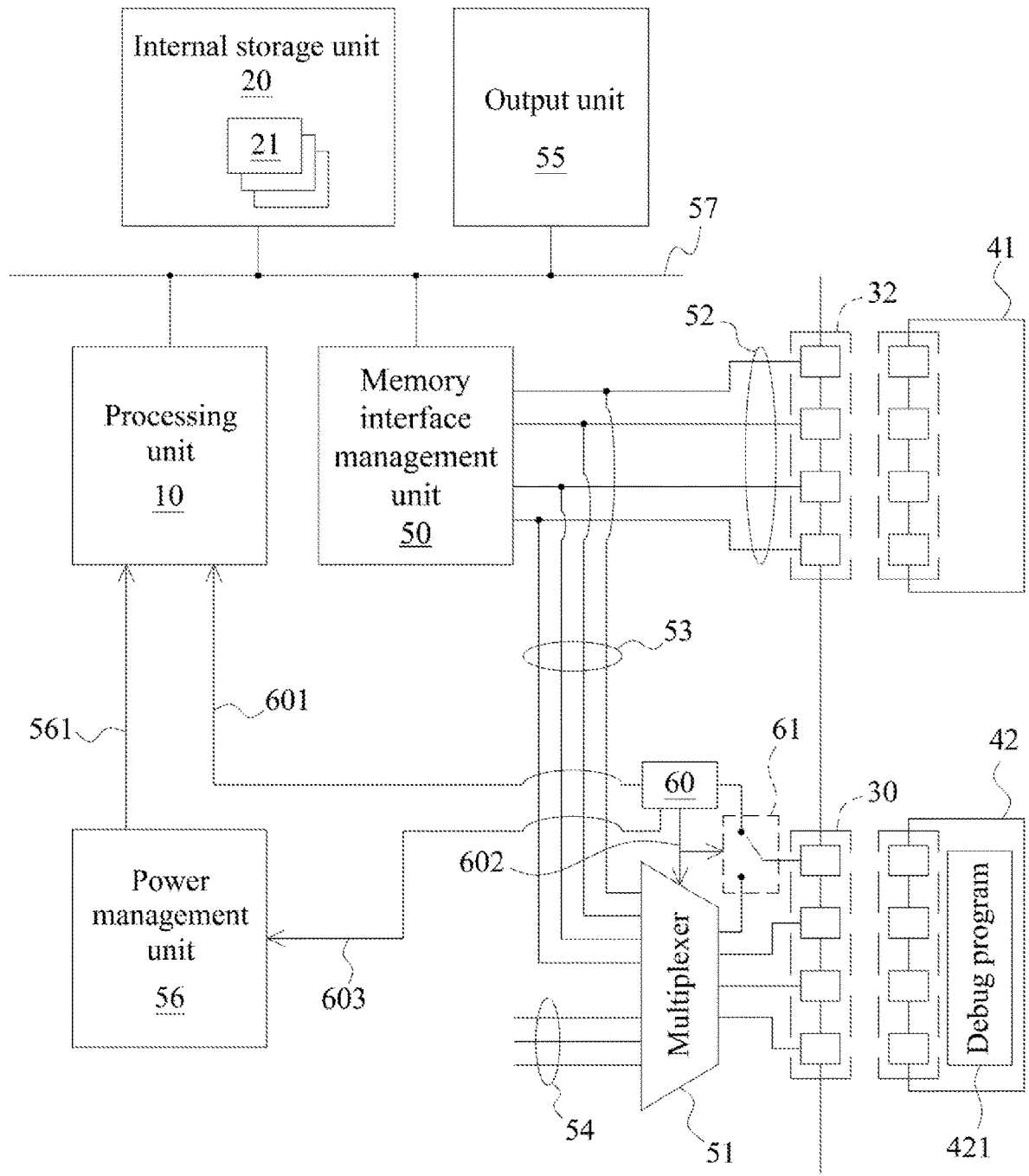
FIG. 1 is a schematic block diagram of a chip having a debug memory interface according to a first embodiment of the invention.
Figure 2:
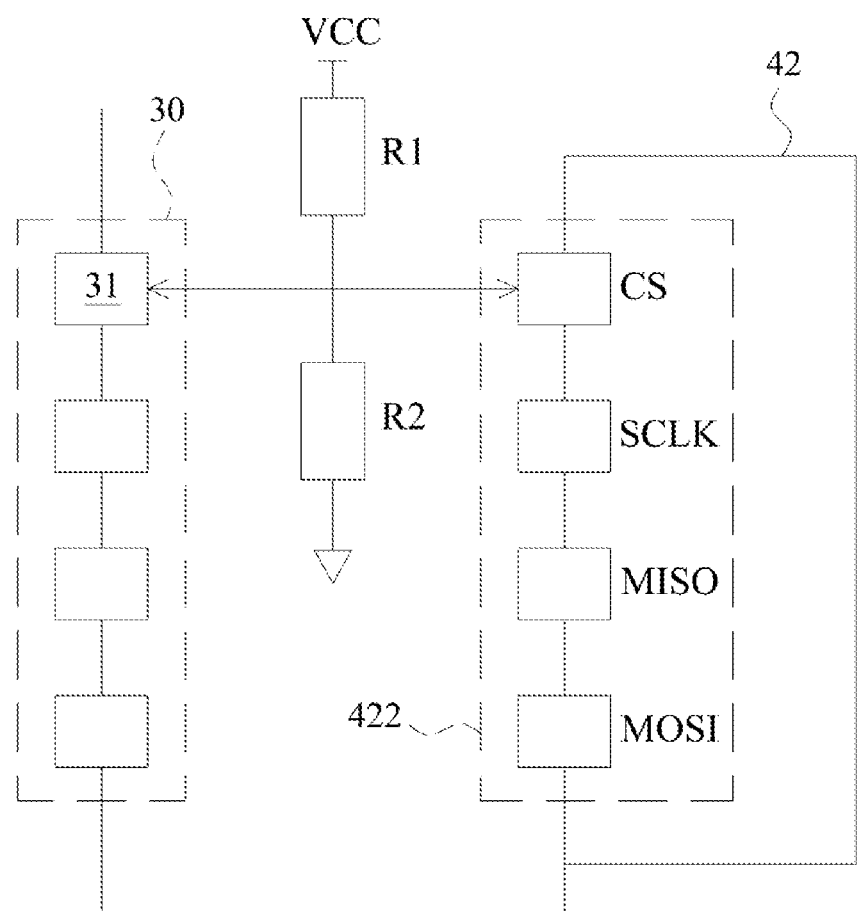
FIG. 2 is a schematic operation diagram of the chip when running a debug mode.

Please refer to FIGS. 1 and 2. FIG. 1 is a schematic block diagram of a chip having a debug memory interface according to a first embodiment of the invention, and FIG. 2 is a schematic operation diagram of the chip when running a debug mode. As shown in FIG. 1, a chip having a debug memory interface may comprise a processing unit 10, an internal storage unit 20, a debug memory interface 30, a normal memory interface 32, a memory interface management unit 50, an output unit 55, a detection unit 60, a power management unit 56, a multiplexer 51, a switch 61, and a bus 57. The processing unit 10, the internal storage unit 20, the memory interface management unit 50, and the output unit 55 are mutually electrically connected to each other.

The processing unit 10 can execute a program, and the internal storage unit 20 is used to record status data 21 generated during operation of the processing unit 10, such as the status data 21 related to the executed program. Preferably, the internal storage unit 20 may comprise at least one register or an internal memory.

The debug memory interface 30 and the normal memory interface 32 may respectively be a serial peripheral interface (SPI). When the processing unit 10 is in a normal operation mode, the processing unit 10 accesses data from a first external memory 41 through the memory interface management unit 50 and the normal memory interface 32. When the processing unit 10 is in a debug mode, the processing unit 10 accesses data from a second external memory 42 through the memory interface management unit 50 and the debug memory interface 30. The memory interface management unit 50 is electrically connected to the normal memory interface 32 and the debug memory interface 30 through the first memory interface circuit set 52 and the second memory interface circuit set 53, respectively.

According to another embodiment of the invention, the chip may not be equipped with the memory interface management unit 50, and the processing unit 10 may directly access the data from the first external memory 41 and the second external memory 42 through the debug memory interface 30 and the normal memory interface 32, respectively.

The detection unit 60 is electrically connected to the processing unit 10, the power management unit 56, the multiplexer 51, the debug memory interface 30, and the switch 61. The detection unit 60 detects whether the debug memory interface 30 is electrically connected to an external memory device (such as the second external memory 42) through a specific pin of the debug memory interface 30. When the detection unit 60 detects that the external memory device (such as the second external memory 42) is electrically connected to the debug memory interface 30, the detection unit 60 can trigger the processing unit 10 to enter and run the debug mode.

Hereinafter, operation of the normal operation mode and the debug mode will be described in detail in conjunction with FIGS. 1 and 2. The debug memory interface 30 and the normal memory interface 32 are illustrated respectively by the serial peripheral interface (SPI) as an example.

The debug memory interface 30 comprises a plurality of pins, and one of the pins is a chip select pin 31. In the normal operation mode, a voltage level of the chip select pin 31 is maintained at low voltage level. In one of the practical application, the chip select pin 31 can be grounded through a resistor R2, so that the voltage level of the chip select pin 31 is maintained at 0 V, as shown in FIG. 2. In order to activate the debug mode of the chip, a resistor R1 may be electrically connected to the chip select pin 31 and a power supply terminal VCC by an operator. The resistance value of the resistor R1 is much smaller than the resistance value of the resistor R2. Therefore, when the resistor R1 is electrically connected to both the power supply terminal VCC and the chip select pin 31 by the operator, the voltage across the resistor R1 is much smaller than the voltage across the resistor R2, causing the voltage level of the chip select pin 31 to change to a high voltage level, as shown in FIG. 2.

In the chip, the chip select pin 31 is selectively electrically connected to the detection unit 60 and the multiplexer 51 through the switch 61. In the normal operation mode, the chip select pin 31 is electrically connected to the detection unit 60 through the switch 61, so the detection unit 60 can detect the voltage level of the chip select pin 31. When the detection unit 60 detects that the voltage level of the chip select pin 31 is at high voltage level, it means that the debug memory interface 30 is electrically connected to an external memory device (such as the second external memory 42). As a response to the change of the voltage level of the chip select pin 31 to a high voltage level, the detection unit 60 generates and outputs a first control signal 601 to the processing unit 10, or generates and outputs a second control signal 603 to the power management unit 56, or simultaneously outputs the first control signal 601 to the processing unit 10 and outputs the second control signal 603 to the power management unit 56. Accordingly, the processing unit 10 is triggered to read the debug program 421 from the second external memory 42 through the debug memory interface 30 and then execute the debug program 421 to perform the debug mode according to the status data 21.

The first control signal 601 or the second control signal 603 can respectively be an interrupt signal, a reset signal or other control signals. When the processing unit 10 is still running but the operator wants to activate the debug mode, the second external memory 42 can be electrically connected to the debug memory interface 30 by the operator, while the voltage level of the chip select pin 31 can be changed to a high voltage level. For example, the resistor R1 with a small resistance value can be electrically connected to the chip select pin 31 and the power supply terminal VCC by the operator, and the detection unit 60 can transmit the interrupt signal to the processing unit 10, so that the currently running program of the processing unit 10 can be interrupted. Next, the processing unit 10 can execute a preset action corresponding to the received interrupt signal. For example, the debug program 421 is read from the second external memory 42 through the debug memory interface 30 and executed.

When the processing unit 10 hangs and the operator wants to activate the debug mode to find out why the processing unit 10 hangs, the second external memory 42 can be electrically connected to the debug memory interface 30 by the operator, and change the voltage level of the chip select pin 31 to a high voltage level. When the detection unit 60 detects that the processing unit 10 hangs and the processing unit 10 does not respond to the interrupt signal, the detection unit 60 can transmit a reset signal to the processing unit 10 to trigger the processing unit 10 to restart. After the processing unit 10 is restarted, the debug program 421 is read from the second external memory 42 through the debug memory interface 30 and executed.

When the processing unit 10 is in a hibernation status and the operator wants to activate the debug mode, the second external memory 42 can be electrically connected to the debug memory interface 30 by the operator, and the voltage level of the chip select pin 31 can be changed to a high voltage level. When the detection unit 60 detects that the processing unit 10 is in the hibernation status, the detection unit 60 can transmit a second control signal 603 to the power management unit 56 in order to trigger the power management unit 56 to output a wake-up signal 561 to the processing unit 10 in order to wake up the processing unit 10 to maintain in an active status. After being awakened, the debug program 421 is read by the processing unit 10 from the second external memory 42 through the debug memory interface 30 and executed.

In another practical application, the memory interface management unit 50 is directly electrically connected to the first external memory 41 and the second external memory 42. Therefore, the second external memory 42 is electrically connected to the debug memory interface 30 when the operator wants to activate the debug mode; meanwhile, the first external memory 41 should be electrically removed from the normal memory interface 32. Hence, the processing unit 10 accesses the data only from the second external memory 42 in the debug mode. However, the foregoing is only an example rather than limiting the invention, and other embodiments of the invention will be described in the following content.

In order to avoid the waste of chip resources caused by idling the pins of the debug memory interface 30 in the normal operation mode, the chip according to another embodiment of the invention may comprise a multiplexer 51 to keep most of the pins of the debug memory interface 30 still capable of other functions in the normal operation mode.

A plurality of input terminals of the multiplexer 51 are respectively electrically connected to a functional circuit set 54 and a second memory interface circuit set 53. When the detection unit 60 does not detect the external memory device, the multiplexer 51 is electrically connected to the pins other than the chip select pin 31 in the debug memory interface 30 (such as the three pins of SCLK, MISO, and MOSI) as well as the functional circuit set 54, and the detection unit 60 is electrically connected to the chip select pin 31 through the switch 61. Therefore, in the normal operation mode, a specific pin of the debug memory interface 30 (the chip select pin 31, for example) is dedicated to detecting the external memory device, and the pins other than the specific pin of the debug memory interface 30 can be used for other functions, such as for GPIO. In this way, the waste of chip resources can be effectively avoided.

When the detection unit 60 detects an external memory device through the chip select pin 31, the detection unit 60 outputs a selection signal 602 to the multiplexer 51 and the switch 61, so that the multiplexer 51 is electrically connected to the second memory interface circuit set 53 and the debug memory interface 30, and the chip select pin 31 is also electrically connected to the second memory interface circuit set 53. Therefore, in the debug mode, the pins of the debug memory interface 30 are all used to be electrically connected the external memory device, and the processing unit 10 can access the external memory device through the debug memory interface 30.

After the debug program 421 is executed by the processing unit 10, the debug mode is executed by the processing unit 10 according to the status data 21. For example, in the debug mode, the processing unit 10 can store the status data 21 in an external memory device or transmit the status data 21 to the output unit 55. For example, after the processing unit 10 hangs, the operator can activate the debug mode to store the data in the register when the processing unit 10 hangs to an external memory device, and the operator can analyze the data to determine why the processing unit 10 hangs.

According to another embodiment of the invention, if the chip is equipped with an output unit 55, such as a light-signal-drive pin or a general-purpose input/output (GPIO) pin, and the operator activates the debug mode, the data in the register can be transmitted through the light-signal-drive pin to a light-signal device for analyzing a light-emitting signal of the light-signal device by the operator to debug. Or, when the operator activates the debug mode, the data in the register can be transmitted to a display device or other debug devices through the GPIO pin for analyzing the displayed contents of the display device or other debug devices by the operator to debug.

According to still another embodiment of the invention, the debug program 421 may comprise encryption and decryption functions. When the data stored in the internal storage unit 20 is all encrypted, the processing unit 10 runs the debug program 421 to execute the decryption function at the same time, so that the data transmitted to the external memory device or the output unit 55 is decrypted and more convenient to be debugged by the operator. Or, when the chip is a security chip, the data transmitted on the bus 57, or the data output to the external memory device or the output unit 55 must be encrypted, so the processing unit 10 can run the debug program 421 while executing the encryption function to make the data transmitted to the external memory device or the output 55 all encrypted.

Figure 3:
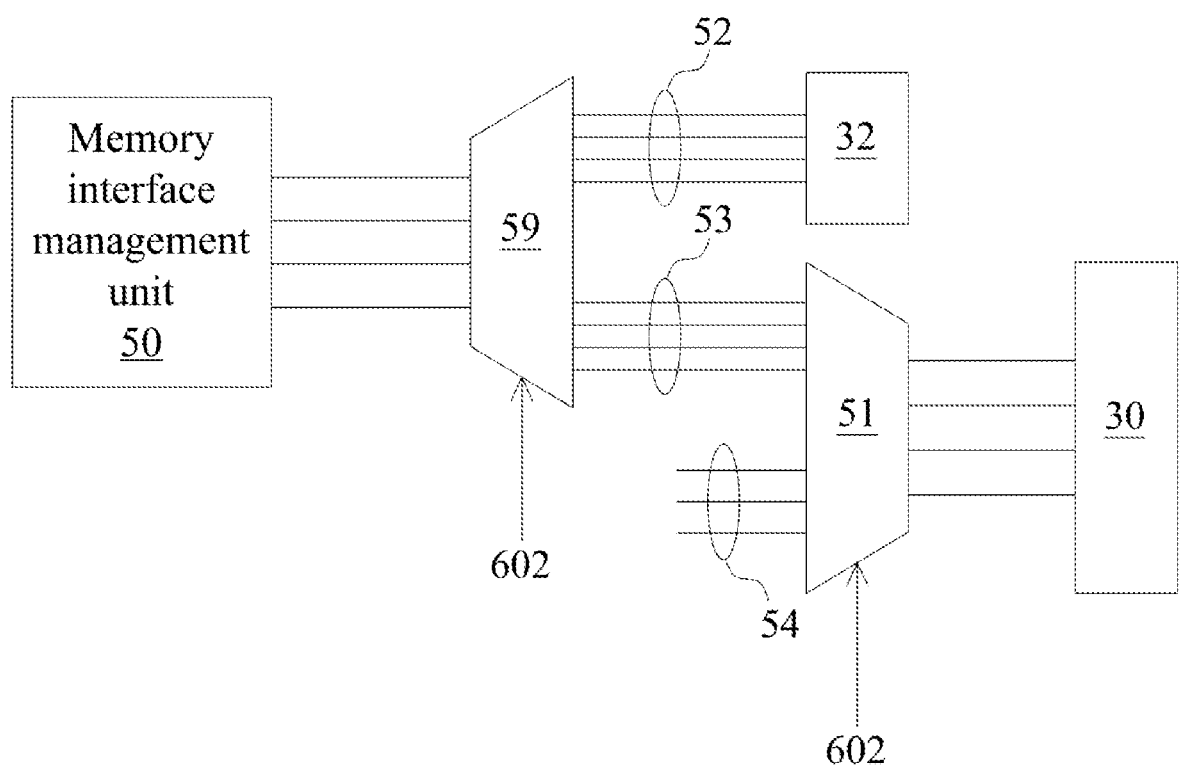
FIG. 3 is a block diagram of a multiplexer used for the debug mechanism of the chip according to a second embodiment of the invention.

FIG. 3 is a block diagram of a multiplexer used for the debug mechanism of the chip according to a second embodiment of the invention. As shown in FIG. 3, the difference between the second embodiment from the first embodiment of the invention is in that the second embodiment of the invention further comprises a multiplexer 59, and the operation principle and connection structure of the other components according to the second embodiment of the invention are the same as those according to the first embodiment of the invention, so the details are not repeated here.

The multiplexer 59 comprises a plurality of output terminals electrically connected to the memory interface management unit 50, a plurality of input terminals electrically connected to the first memory interface circuit set 52 and the second memory interface circuit set 53, and a control terminal for receiving the selection signal 602 from the detection unit 60. In a normal operation mode, the multiplexer 51 is electrically connected to the first memory interface circuit set 52 and the memory interface management unit 50, so that the processing unit 10 can access the data from the first external memory 41 through the memory interface management unit 50 and the normal memory interface 32. When the detection unit 60 detects an external memory device through the chip select pin 31, the detection unit 60 outputs the selection signal 602 to the multiplexer 59, so that the multiplexer 51 is electrically connected to the second memory interface circuit set 53 and the memory interface management unit 50, which then enables the processing unit 10 to access the data from the second external memory 42 through the memory interface management unit 50 and the debugging memory interface 30.

Figure 4:
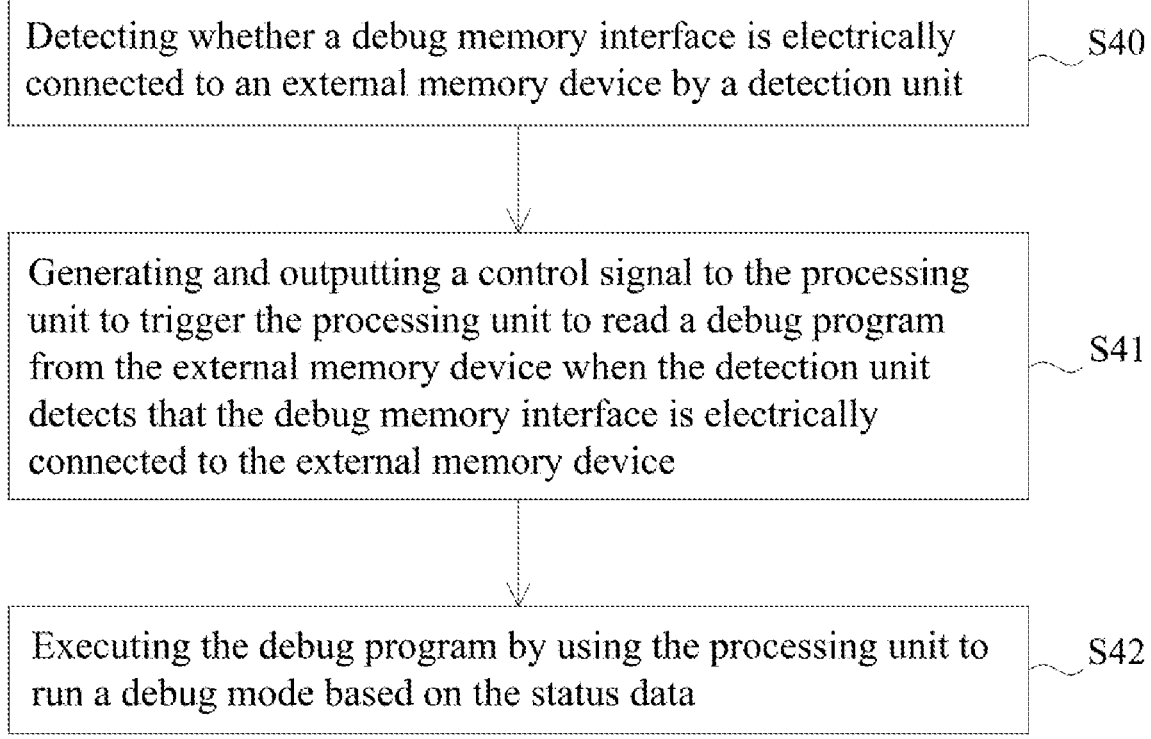
FIG. 4 is a flowchart of steps of a debug method according to an embodiment of the invention.

Please refer to FIG. 4. FIG. 4 is a flowchart of steps of a debug method according to an embodiment of the invention. As shown in FIG. 4, the debug method according to the embodiment of the invention is applicable to a chip, such as the chip shown in FIG. 1. The chip comprises a processing unit and an internal storage unit, and the internal storage unit is used to store status data generated during operation of the processing unit. The steps S40-S42 of the debug method according to the embodiment of the invention will be described in detail below with reference to FIG. 1. In step S40, a debug memory interface 30 and a detection unit 60 are provided in the chip, and the detection unit 60 is used to detect whether the debug memory interface 30 is electrically connected to an external memory device.

In step S41, when the detection unit 60 detects that the debug memory interface 30 is electrically connected to an external memory device, the detection unit 60 generates and outputs a control signal to the processing unit 10 to trigger the processing unit 10 to read a debug program 421 from the external memory device. According to another embodiment of the invention, the control signal can be an interrupt signal or a reset signal.

According to still another embodiment of the invention, the debug memory interface 30 may be a serial peripheral interface, and the step S41 further comprises the followings steps. The detection unit 60 is used to detect whether a voltage level of the chip select pin 31 in the serial peripheral interface is at a high voltage level. When the detection unit 60 judges that the voltage level of the chip select pin 31 is at a high voltage level, the detection unit 60 can judge that the serial peripheral interface is electrically connected to an external memory device and output a control signal to the processing unit 10.

In step S42, the processing unit 10 is used to execute the debug program 421 to run a debug mode based on the status data 21. According to still another embodiment of the invention, in the debug mode, the processing unit 10 can store the status data 21 in the external memory device. Or, when the chip comprises an output unit 55, such as a light-signal-driven pin or a general-purpose input/output (GPIO) pin, the status data 21 may be transmitted to a light-signal device through the light-signal-driven pin in the debug mode for analyzing a light-emitting signal by the operator to debug. Alternatively, the status data 21 can be transmitted to a display device or other debug devices through the GPIO pin for analyzing the displayed content of the display device or other debug devices to debug.

Figure 5:
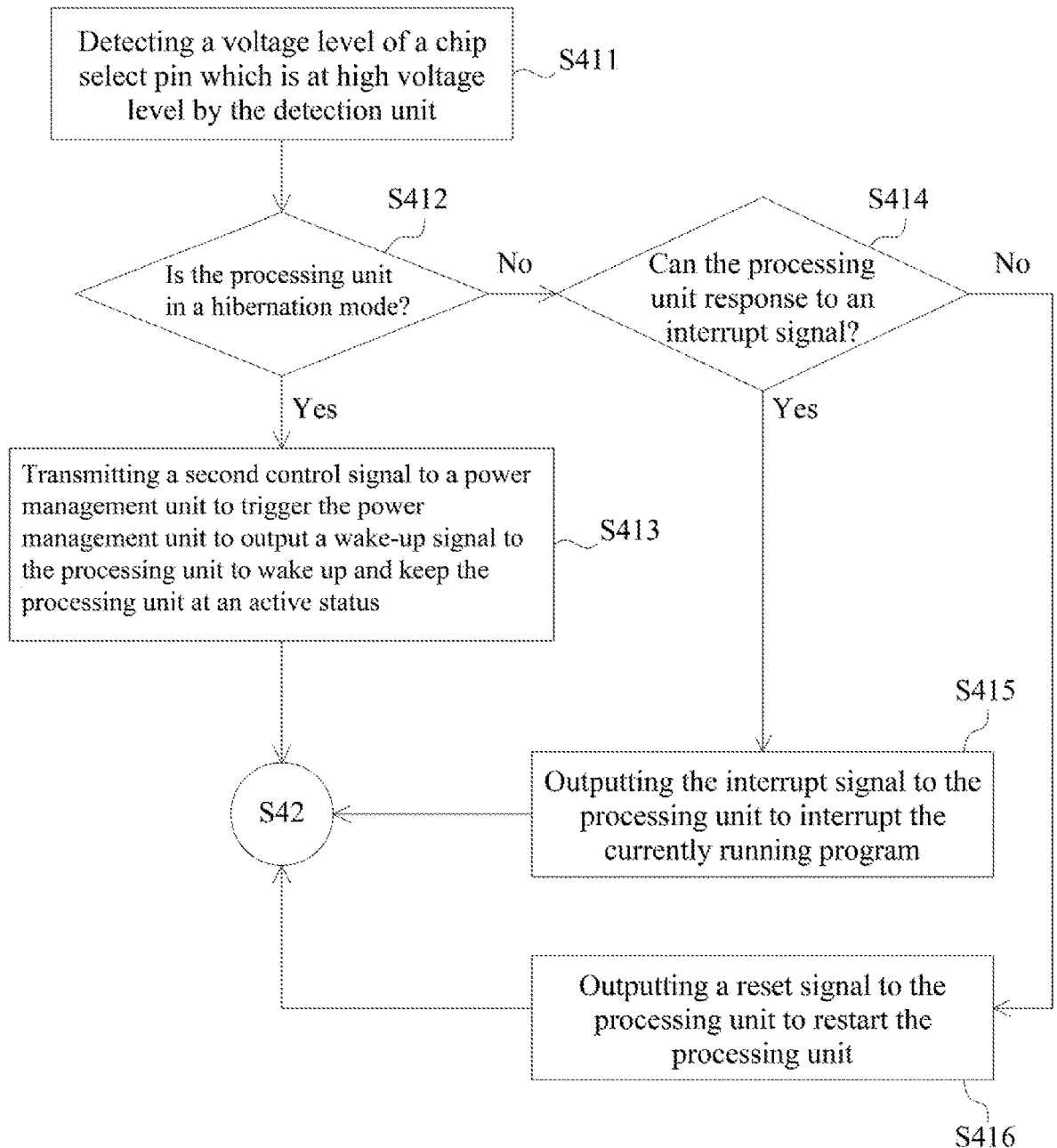
FIG. 5 is a flowchart of steps of the debug method according to the embodiment of the invention.

Please refer to FIG. 5. FIG. 5 is a flowchart of steps of the debug method according to the embodiment of the invention.

In step S411 of FIG. 5, when a voltage level of the chip select pin 31 is detected by the detection unit 60 and judged as at a high voltage level, the debug memory interface 30 is supposed to be electrically connected to an external memory device. In step S412, the processing unit 10 is subsequently detected and further judged whether the processing unit 10 is in a hibernation status. Step S413 is performed when the processing unit 10 is in the hibernation status; otherwise, step S414 is performed when the processing unit 10 is not in the hibernation state.

In step S413, a second control signal 603 is transmitted to the power management unit 56 by the detection unit 60 in order to trigger the power management unit 56 to output a wake-up signal 561 to the processing unit 10, so that the processing unit 10 may be awaken and maintained in an active status. Next, step S42 is performed.

In step S414, the processing unit 10 is judged by whether the processing unit 10 can respond to the interrupt signal. Step S415 is performed when the processing unit 10 can respond to the interrupt signal; otherwise, step 416 is performed when the processing unit 10 cannot respond to the interrupt signal.

In step S415, the detection unit 60 transmits an interrupt signal to the processing unit 10 to interrupt the currently running program in the processing unit 10. Then, step S42 is performed to execute a preset action corresponding to the received interrupt signal. For example, the debug program 421 is read from the second external memory 42 through the debug memory interface 30 and executed.

In step S416, the detection unit 60 may transmit a reset signal to the processing unit 10 to trigger the processing unit 10 to restart, and step S42 is then performed. For example, after the processing unit 10 is restarted, the debug program 421 is read from the second external memory 42 through the debug memory interface 30 and executed.

In summary, the chip having a debug memory interface according to embodiments of the invention allows an operator to conveniently and directly obtain status data during operation of a processing unit through a debug memory interface to further debug. Therefore, no dedicated debug tool, such as a joint test action group (JTAG) tool or an in-circuit emulator (ICE), is needed, and debugging can even be performed by small chips with simpler circuit structures and fewer pins. Additionally, in a debug memory interface, only at least one pin is needed and reserved for detection, and most of the pins of the debug memory interface can be with multiple functions. Therefore, the proposed chip structure according to embodiments of the invention does not occupy too many pins, which means that it is also quite suitable for small chips with a small number of pins.

Although the invention is disclosed in the foregoing embodiments, it is not intended to limit the invention. Anyone who is familiar with similar art can make some changes and modifications without departing from the spirit and scope of the invention. Therefore, the claimed scope of the invention shall be determined and dependent on the scope of the claims attached to the specification.

What is claimed is:

1. A chip having a debug memory interface, comprising:
   a processing unit;
   an internal storage unit for recording status data generated during the operation of the processing unit;
   a debug memory interface comprising a chip select pin, wherein the debug memory interface is electrically connected to an external memory device through the chip select pin; and
   a detection unit electrically connected to the chip select pin through a switch for detecting a voltage level of the chip select pin and determining whether the chip select pin is electrically connected to the external memory device according to the voltage level of the chip select pin,
   wherein the detection unit generates and outputs a control signal to trigger the processing unit for reading a debug program from the external memory device to execute the debug program to run a debug mode based on the status data when the detection unit detects that the chip select pin is electrically connected to the external memory device.

2. The chip of claim 1, further comprising a memory interface management unit electrically connected to the debug memory interface, wherein the memory interface management unit is used by the processing unit to read the debug program from the external memory device.

3. The chip of claim 2, further comprising a multiplexer with a plurality of input terminals thereof respectively electrically connected to the functional circuit set and a memory interface circuit group, wherein the multiplexer is electrically connected to a plurality of pins except the chip select pin in the serial peripheral interface as well as the functional circuit set when the detection unit detect absence of the external memory device, and the multiplexer is electrically connected to the memory interface circuit group as well as the serial peripheral interface when the detection unit detects presence of the external memory device.

4. The chip of claim 3, wherein the chip select pin is selectively electrically connected to one of the detection unit and the multiplexer through the switch.

5. The chip of claim 3, wherein the control signal is an interrupt signal or a reset signal.

6. The chip of claim 3, further comprising a power management unit informed by the detection unit to keep the processing unit at an active status so that the debug program is read from the external memory device by the processing unit.

7. The chip of claim 3, wherein the debug mode comprises storing the status data in the external memory device by the processing unit.

8. The chip of claim 3, further comprising an output unit, wherein in the debug mode, the processing unit transmits the status data to the output unit, the output unit comprises a general-purpose input/output pin or a display element, and the display element is used to display the status data, while the general-purpose input/output pin is used to transmit the status data to an external device.

9. A debug method applied to a chip having a processing unit and an internal storage unit where the internal storage unit is used to store status data generated during operation of the processing unit, and the debug method comprising the following steps:
   providing a debug memory interface and a detection unit, the debug memory interface comprising a chip select pin to electrically connect an external memory device through the chip select pin,
   using the detection unit to detect a voltage level of the chip select pin to determine whether the debug memory interface is electrically connected to the external memory device;
   generating and outputting a control signal to the processing unit to trigger the processing unit to read a debug program from the external memory device when the detection unit detects that the chip select pin is electrically connected to the external memory device; and
   executing the debug program by using the processing unit to run a debug mode based on the status data.

* * * * *